United States Patent [19]

Nilssen

[11] Patent Number: 4,644,459
[45] Date of Patent: Feb. 17, 1987

[54] ELECTRONIC INVERTER HAVING MAGNITUDE-CONTROLLABLE OUTPUT

[76] Inventor: Ole K. Nilssen, Caesar Dr., Barrington Hills, Ill. 60010

[21] Appl. No.: 697,716

[22] Filed: Feb. 4, 1985

[51] Int. Cl.[4] .......................................... H02M 7/538
[52] U.S. Cl. .................................. 363/133; 315/223; 331/113 A; 363/100
[58] Field of Search ............. 331/113 A, 114; 363/22, 363/100, 133; 315/219, 220, 209 R, 98, 224

[56] References Cited

U.S. PATENT DOCUMENTS

| | | | |
|---|---|---|---|
| 3,315,178 | 4/1967 | Chernish | 331/114 |
| 4,277,726 | 7/1981 | Burke | 315/201 |
| 4,279,011 | 7/1981 | Nilssen | 363/133 |
| 4,460,949 | 7/1984 | Steigerwald | 363/136 |
| 4,484,108 | 11/1984 | Stupp et al. | 315/219 |
| 4,508,996 | 4/1985 | Clegg et al. | 315/224 |
| 4,513,364 | 4/1985 | Nilssen | 363/132 |
| 4,535,271 | 8/1985 | Holmes | 315/224 |
| 4,562,382 | 12/1985 | Elliott | 331/113 A |

FOREIGN PATENT DOCUMENTS

| | | | |
|---|---|---|---|
| 1359664 | 3/1964 | France | 363/133 |
| 14376 | 1/1984 | Japan | 363/133 |
| 32368 | 2/1984 | Japan | 363/133 |
| 2103444 | 2/1983 | United Kingdom | 363/100 |

OTHER PUBLICATIONS

Baker, "High Frequency Power Conversion with FET-Controlled Resonant Charge Transfer", PCI Apr. 1983 Proceedings, pp. 130–133.

Primary Examiner—William H. Beha, Jr.

[57] ABSTRACT

A push-pull inverter is supplied from an inductively current-limited DC voltage source by way of a center-tap on a transformer having significant inductance. This transformer inductance is parallel-coupled with a capacitance means. The inverter is made to self-oscillate through positive feedback provided by way of a saturable current transformer. The inverter frequency is determined by the saturation time of this current transformer, which saturation time is designed to be longer than the half-cycle period of the natural resonance frequency of the transformer inductance combined with the capacitance means. The resulting inverter output voltage may be described as a sequence of substantially sinusoidal half-cycles interconnected with periods of zero-magnitude voltage. By controlling the length of the saturation time, the effective magnitude of the inverter output voltage is controlled, thereby permitting control of the amount of power provided to a load connected thereto.

7 Claims, 2 Drawing Figures

ELECTRONIC INVERTER HAVING MAGNITUDE-CONTROLLABLE OUTPUT

BACKGROUND OF THE INVENTION

1. Field of Invention

The present invention relates to an inverter-type power supply operated from a source of constant-magnitude DC voltage and having means to control the magnitude of the resulting substantially non-current-limited inverter AC voltage output.

2. Prior Art

The Applicant is not aware of any inverter powered from a source of constant-magnitude DC voltage and operable to provide a substantially non-current-limited AC voltage output and having means to control the effective magnitude of this AC voltage.

SUMMARY OF THE INVENTION

Objects of the Invention

An object of the present invention is that of providing cost-effective means for controlling and/or regulating the magnitude of the substantially non-current-limited AC voltage resulting from inverting a constant-magnitude DC voltage.

This as well as other important objects and advantages of the present invention will become apparent from the following description.

BRIEF DESCRIPTION

A push-pull inverter is supplied from an inductively current-limited DC voltage source by way of a center-tap on a transformer having significant inductance. This transformer inductance is parallel-coupled with a capacitance means; and the output from the transformer is connected to a load.

The inverter is made to self-oscillator through positive feedback provided by way of a saturable current transformer. The inverter frequency is determined by the saturation time of this current transformer, which saturation time is designed to be longer than the half-cycle period of the natural resonance frequency of the transformer inductance means combined with the parallel-coupled capacitance means.

The saturable current transformer comprises a ferrite magnetic core. The length of the saturation time of this transformer is determined by the magnitude of the magnetic saturation flux of this ferrite core. The magnitude of this saturation flux is determined by the temperature of the ferrite core: the higher the temperature, the lower the magnitude of the saturation flux, and the shorter the saturation time.

By controllably heating the ferrite core, the saturation time and thereby the inverter frequency can be controlled; which, by controlling the inversion frequency in relationship to the natural resonance frequency, implies that the effective magnitude of the inverter AC voltage output can be controlled—without requiring the inverter output to comprise a substantial internal impedance.

DESCRIPTION OF THE PREFERRED EMBODIMENT

Details of Construction

Figure 1:
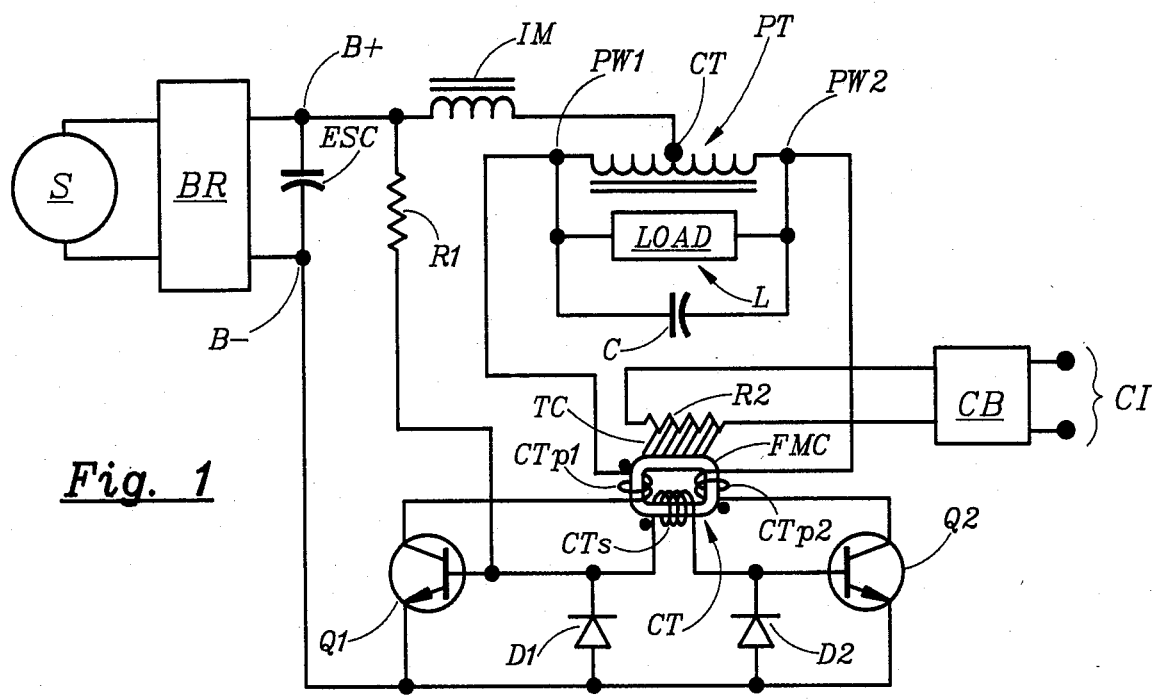
FIG. 1 provides a schematic circuit diagram of the preferred embodiment of the invention.

FIG. 1 shows an AC voltage source S, which in reality is an ordinary 120 Volt/60 Hz electric utility power line. Connected directly across S is a bridge rectifier BR, the DC output from which is applied to a B+ terminal and a B− terminal—with the B+ terminal being of positive polarity in respect to the B− terminal. Connected directly between the B+ and B− terminals is an energy-storing capacitor ESC.

Connected between the B+ terminal and a center-tap CT of the primary winding PW of a power transformer PT is an inductor means IM. Primary winding PW has two terminals PW1 and PW2 in addition to its center-tap CT. Across terminals PW1 and PW2 is connected a capacitor C as well as a load L.

The collector of a first transistor Q1 is connected to terminal PW1 by way of a first primary winding CTp1 of a saturable feedback current transformer CT; and the collector of a second transistor Q2 is connected to terminal PW2 by way of a second primary winding of current transformer CT.

Secondary winding CTs of current transformer CT is connected directly between the bases of transistors Q1 and Q2. Current transformer CT has a ferrite magnetic core FMC.

A diode D1 is connected between the base and the emitter of transistor Q1, with the diode's cathode being connected to the base. Similarly, a diode D2 is connected between the base and the emitter of transistor Q2, with the diode's cathode being connected to the base. The emitters of transistors Q1 and Q2 are both connected with the B− terminal. Connected between the B+ terminal and the base of transistor Q1 is a transistor R1.

A resistor R2 is placed in close proximity with the ferrite magnetic core FMC of current transformer CT; and a thermal conduction means TC is placed between resistor R2 and this ferrite magnetic core FMC. Resistor R2 is connected with the output of a control box CB, which has a control input CI.

Details of Operation

In FIG. 1, the 120 Volt/60 Hz power line voltage is rectified by rectifier BR and, due to the filtering effect of capacitor ESC, provides a DC voltage of substantially constant magnitude between the B+ and the B+ terminals. At normal line voltage, the magnitude of this DC voltage is about 160 Volt.

By way of its input CI, control box CB controllably provides electric heating power to resistor R2. The purpose of providing heat to R2, and thereby to the ferrite magnetic core, is that of controlling the oscillating frequency of the inverter; which frequency is principally determined by the saturation time of the saturable feedback current transformer CT. This saturation time is principally determined by the saturation magnetic flux density of the ferrite magnetic core FMC; and the saturation flux density, in turn, is a function of the temperature of the ferrite magnetic core: the higher the core temperature, the lower the magnitude of the saturation flux density.

Otherwise, the operation of the inverter circuit itself, which consists of inductor means IM, power transformer PT, saturable feedback current transformer CT, transistors Q1 and Q2, diodes D1 and D2, and biasing resistor R1, may be understood as a combination of the basic inverter circuits described in U.S. Pat. No. 4,277,726 to Burke and in U.S. Pat. No. 4,279,011 to Nilssen. By combining features of these two types of inverter circuits, useful effects may be obtained.

In the basic inverter circuit described by Burke, inverter oscillating frequency is determined by the inductance of power transformer PT as naturally interacting with the net capacitive reactance parallel-connected therewith (i.e., capacitor C).

On the other hand, in the basic inverter circuit described by Nilssen, inverter oscillating frequency is determined by the saturation time of the saturable feedback current transformer.

In the circuit of FIG. 1, inverter oscillating frequency is principally determined by the saturation time of saturable feedback current transformer CT. However, for this to be the case, it is necessary that this saturation time be longer than the half-period of the natural resonance frequency associated with the inductance of the power transformer as interacting with the capacitive reactance represented by capacitor C.

Figure 2:
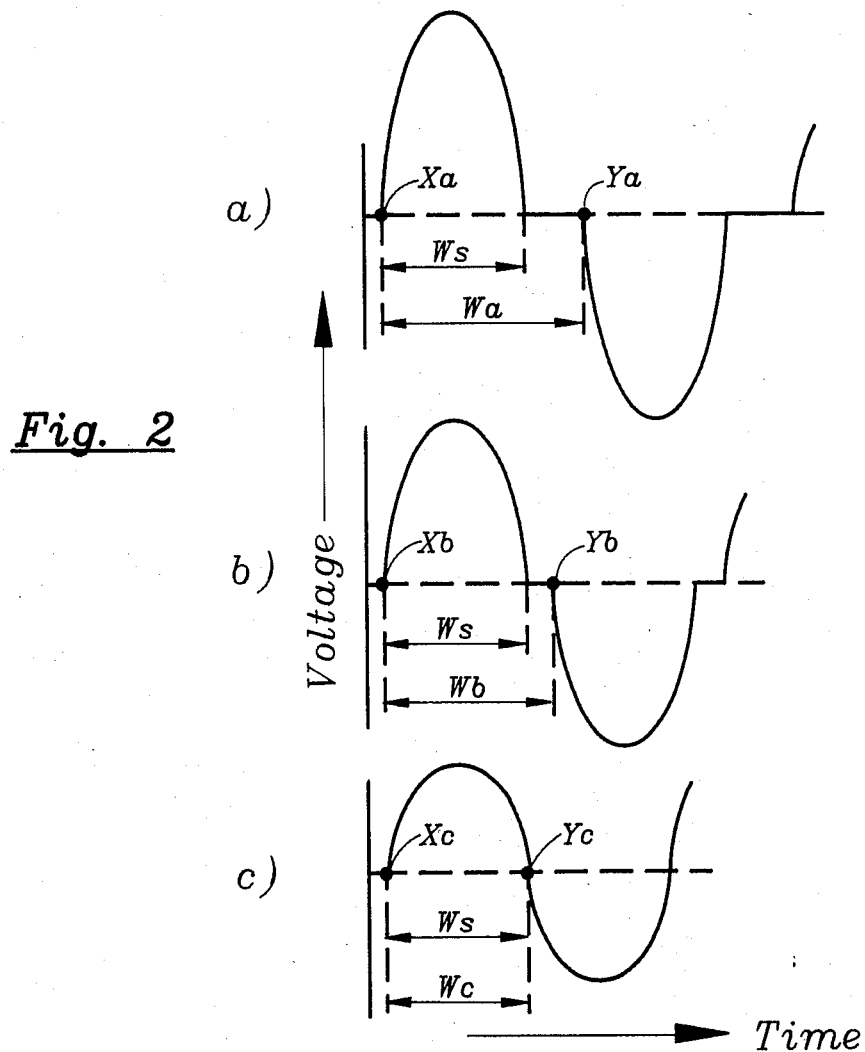
FIG. 2 provides illustration of various voltage waveforms associated with the embodiment of FIG. 1.

By way of various voltage waveforms, FIG. 2 effectively illustrates the operation of the inverter circuit of FIG. 1.

Under the condition of providing no heating power to resistor R2, FIG. 2a shows the waveform of the inverter AC voltage output as provided across power transformer PT and as observed between its center-tap CT and terminal PW1. The average voltage-magnitude of this waveform—which may be described as a series of sinusoidal half-cycles interconnected with periods of substantially zero-magnitude voltage—during a complete inverter half-cycle (i.e., between points Xa and Ya in FIG. 2a) must by basic necessity be equal to 160 Volt, which is the magnitude of the DC supply voltage.

By choice of saturation time for current transformer CT (with no heating provided by resistor R2), the width Wa of this complete inverter half-cycle is made to be about twice as wide as the width Ws of the base of the sinusoidal half-cycle existing between points Xa and Ya. As a necessary consequence of this fact, the amplitude of the sinusoidal half-cycle per se must be about twice as large as would have had to be the case if the width Ws of this sinusoidal half-cycle had been equal to that of the complete inverter half-cycle Wa. Thus, to yield an average voltage of 160 Volt over the complete inverter half-cycle, the peak magnitude of the sinusoidal half-cycle must be approximately 502 Volt.

It is noted that the sinusoidal half-cycle located between points Xa and Ya is a half-cycle of the natural resonance action between the inductance of power transformer PT and its parallel-connected capacitor C. Thus, the degree by which the distance between points Xa and Ya is longer than the base of the sinusoidal half-cycle corresponds to the degree by which the inverter's oscillating frequency is lower than the natural resonance frequency of the inductance of power transformer PT as interacting with its parallel-connected capacitor C.

FIG. 2b shows the waveform of the inverter AC voltage output under the condition of providing sufficient heating power to resistor R2 to cause the saturation time of transformer CT to be about 25% shorter than for the case of FIG. 2a. Since the average magnitude of the voltage existing between points Xb and Yb must still be equal to 160 Volt, the magnitude of the sinusoidal half-cycle per se must have decreased by 25%. Thus, the peak voltage in this case must be 25% less than 502 Volt, or about 377 Volt.

FIG. 2c shows the waveform of the inverter AC voltage output under the condition of providing sufficient heating power to resistor R2 to cause the saturation time of transformer CT to be about 50% shorter than for the case of FIG. 2a. Since the average magnitude of the voltage existing between points Xb and Yb must still be equal to 160 Volt, the magnitude of the sinusoidal half-cycle per se must have decreased by 50%. Thus, the peak voltage in this case must be 50% less than 502 Volt, or about 251 Volt.

In comparing FIGS. 2a, 2b and 2c, it is seen that the peak magnitude of the sinusoidal half-cycles per se is directly proportional to the length of the complete inverter half-cycle—that is, inversely proportional to the inverter oscillating frequency.

Thus, with a resistive load, for each inverter half-cycle, the energy pulse provided to the load increases in magnitude as the square of the peak magnitude of the sinusoidal half-cycle. However, the frequency of these energy pulses decreases only linearly with the peak magnitude; which in combination implies that the effective RMS magnitude of the inverter AC voltage output decreases with the half-power of the inverter oscillating frequency.

Or, in other words, providing increased heating power to resistor R2 results in a decreased RMS magnitude of the inverter AC voltage output—assuming that the magnitude of the DC supply voltage is kept constant. Up to the point illustrated by FIG. 2c, where the inversion frequency has become as high as the natural resonance frequency of the inductance of transformer PT and its parallel-connected capacitor C, the RMS magnitude of the inverter AC voltage output is roughly proportional to the square root of the magnitude of the flux saturation level of the saturable feedback transformer CT.

Of course, the peak magnitude of the inverter AC voltage output is directly proportional to the magnitude of this flux saturation level.

The degree of controlling effect achieved by providing a given amount of heating power to resistor R2 depends on several factors: the thermal coupling between R2 and the magnetic ferrite core MFC; the physical size of transformer CT; the rate of heat loss experienced by this transformer; etc.

By providing heating power to resistor R2 as a function of variations in the magnitude of the DC supply voltage, it is readily possible to arrange for partial or complete regulation of the RMS magnitude of the inverter AC voltage output in response to such variations.

By making R2 non-linear (such as, for instance, by combining it with one or more Zener diodes and/or a thermistors), it is possible to provide a wide variety of regulation and/or control profiles; thereby, for instance, attaining very accurate regulation of the RMS magnitude of the inverter AC voltage output versus variations in magnitude of the DC supply voltage.

It is noted that the waveshape and the magnitude of the inverter output AC voltage does not change as a function of load: they remain substantially the same over the range from open circuit to the maximum load that the inverter is capable of handling. The reasons for this characteristic is simply that there are no current-limiting impedances provided for in the inverter circuit of FIG. 1. In this connection, it is noted that inductor means IM is not a current-limiting means as fas as DC current is concerned; which implies that, except for transient conditions, there is no limitations on the amount of current that can flow from the DC voltage supply—i.e., from the B+ and the B— terminals.

However, as well known in the inverter art of the type described in U.S. Pat. No. 4,277,726 to Burke, within the time-span of a complete inverter period, the inductor means IM may be considered as a current-limiting means. To be precise, it may be properly described as an inductive current-limiting means.

Thus, except for a brief period associated with the time-constant of inductor means IM, the AC voltage output as provided across transformer PT may be considered as a stiff voltage source, having substantially negligible internal impedance. That is, up to the destructive limit of the inverter's capabilities, the magnitude and waveshape of the AC voltage output will remain the same regardless of the nature of the load L.

The voltage waveforms illustrated by FIG. 2, such as the one shown by FIG. 2a, correspond to the voltage provided to the load L. These waveforms may be described as sinusoidal half-cycles interconnected with periods of substantially zero voltage.

In respect to the effect of temperature on the magnitude of the magnetic saturation flux of ferrite magnetic cores, reference is made to various handbooks and product catalogs relating to magnetic ferrites for inverter applications.

It is believed that the present invention and its several attendant advantages and features will be understood from the preceeding description. However, without departing from the spirit of the invention, changes may be made in its form and in the construction and interrelationships of its component parts, the form herein presented merely representing the presently preferred embodiment.

I claim:

1. An arrangement comprising:
source of inductively current-limited DC voltage;
inverter means connected with the source of DC voltage and operative to provide an AC voltage at an inverter output, the inverter means: (i) having electronic switching means that is electrically controllable by way of control input terminals, and (ii) being selfi-oscillating at an inversion frequency by way of positive feedback provided from the inverter output to the control input terminals; and
a parallel-combination of an inductor means and a capacitor means connected with the inverter output, this parallel-combination having: (i) a natural resonance frequency determined by the product of the inductance of the inductor means and the capacitance of the capacitor means, and (ii) an AC voltage present across it, the fundamental frequency of this AC voltage being equal to the inversion frequency, the inversion frequency being lower than said natural resonance frequency.

2. The arrangement of claim 1 wherein the inverter means additionally comprises control means operative to permit control of the inversion frequency.

3. The arrangement of claim 2 wherein the inversion frequency may be controlled by way of an electrical input signal.

4. The arrangement of claim 1 wherein the AC voltage consists of sinusoidal half-cycles interconnected with periods of substantially zero-magnitude voltage.

5. An arrangement comprising:
source of inductively current-limited DC voltage;
inverter means connected with the source of DC voltage and operative to provide an AC voltage at an inverter output, the inverter means: (i) having electronic switching means that is electrically controllable by way of control input terminals, and (ii) being self-oscillating at an inversion frequency by way of positive feedback provided from the inverter output to the control input terminals; and
load means connected with the inverter output, this load means: (i) comprising a parallel-combination of an inductor and a capacitor, and (ii) having an AC voltage present across it, the waveshape of this AC voltage being to a substantial degree determined by said parallel-combination and consisting of sinusoidally shaped pulses of alternating polarity voltage interconnected with periods of substantially zero-magnitude voltage.

6. An arrangement comprising:
source of inductively current-limited DC voltage;
push-pull inverter means connected with the source of DC voltage and operative to provide an AC voltage at an inverter output, the inverter means: (i) having a pair of electronic switching means that are electrically controllable by way of control input terminals, and (ii) being self-oscillating at an inversion frequency by way of positive feedback provided from the inverter output to the control input terminals; and
a parallel-combination of an inductor means and a capacitor means connected with the inverter output, this parallel-combination having: (i) a natural resonance frequency determined by the product of the inductance of the inductor means and the capacitance of the capacitor means, and (ii) an AC voltage present across it, the fundamental frequency of this AC voltage being equal to the inversion frequency, the inversion frequency being lower than the parallel-combination's natural resonance frequency.

7. An arrangement comprising:
source of inductively current-limited DC voltage; and
inverter means connected with this source and operative to provide an AC voltage at an inverter output,
the inverter means: (i) having electronic switching means that is electrically controllable by way of control input terminals, (ii) being self-oscillating at a fundamental inversion frequency by way of positive feedback provided from the inverter output to the control input terminals, and (iii) having a parallel-combination of an inductor means and a capacitor means connected with the output, this parallel-combination having a natural resonance frequency determined by the product of the inductance of the inductor means and the capacitance of the capacitor means, this natural resonance frequency being higher than the inversion frequency,
the AC voltage consisting of alternating voltage pulses of sinusoidal shape, the sinusoidally shaped voltage pulses being interconnected with periods of substantially zero-magnitude voltage, the shape of the voltage pulses being substantially determined by said parallel-combination.

* * * * *